United States Patent
Brants

(10) Patent No.: US 8,239,200 B1
(45) Date of Patent: Aug. 7, 2012

(54) DELTA LANGUAGE MODEL

(75) Inventor: Thorsten Brants, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1027 days.

(21) Appl. No.: 12/192,259

(22) Filed: Aug. 15, 2008

(51) Int. Cl.
*G06F 17/27* (2006.01)
*G10L 15/18* (2006.01)
*G10L 15/28* (2006.01)
*G10L 15/00* (2006.01)

(52) U.S. Cl. ............. 704/257; 704/9; 704/231; 704/255

(58) Field of Classification Search .............. 704/9, 231, 704/255, 257
See application file for complete search history.

(56) References Cited

U.S. PATENT DOCUMENTS

| | | | |
|---|---|---|---|
| 5,280,563 A * | 1/1994 | Ganong | 704/200 |
| 5,526,465 A * | 6/1996 | Carey et al. | 704/250 |
| 6,275,803 B1 | 8/2001 | Lewis | |
| 6,304,841 B1 * | 10/2001 | Berger et al. | 704/2 |
| 6,912,499 B1 * | 6/2005 | Sabourin et al. | 704/243 |
| 7,415,409 B2 | 8/2008 | Simoneau et al. | |
| 2001/0029453 A1 * | 10/2001 | Klakow et al. | 704/257 |
| 2004/0230420 A1 * | 11/2004 | Kadambe et al. | 704/205 |
| 2004/0249629 A1 * | 12/2004 | Webster | 704/4 |
| 2006/0277033 A1 * | 12/2006 | Gao et al. | 704/10 |
| 2008/0319736 A1 * | 12/2008 | Toutanova et al. | 704/9 |

OTHER PUBLICATIONS

Zheng, et al. Discriminative Training on language model, Microsoft Research, 2000, 4 pages.
Language Model, Wikipedia [online] Retrieved on Jan. 14, 2010 from http://web.archive.org/20060913000000/http:/en.wikipedia.org/wiki/Language_model,, Sep. 13, 2006, 1 page.
Exercise8 Language Modeling (LM), [online] Retrieved on Jan. 14, 2010 from http://wvvw.cs.cmu.edu/~tanja/11-753/Lectures-Thomas/Exercises_Solutions/Session8/exercise8.html, Publisher Feb. 9, 2006, 4 pages.
Goel, et al. "Language Model Estimation for Optimizing End-to-End Performance of a Natural Language Call Routing System," [online] Retrieved on Jan. 14, 2010 from http://sail.usc.edu/~georgiou/pdfs/0100565, IEEE, 2005, 4 pages.
Uszkoreit, J. and Thorsten B., "Distributed Word Clustering for Large Scale Class-Based Language Modeling in Machine Translation", in *Proceedings of ACL-08: HLT*, pp. 755-762, Jun. 2008, 8 pages.

* cited by examiner

*Primary Examiner* — Justin Rider
(74) *Attorney, Agent, or Firm* — Harness, Dickey & Pierce, P.L.C.

(57) ABSTRACT

Among other disclosed subject matter, a computer-implemented method for generating a language model includes generating a language model based on a data set, the data set including at least training data and test data. The test data is to be used in testing the language model. The method includes identifying the test data in the data set. The method includes generating a delta language model based on at least the test data, the delta language model configured for evaluating the test data.

22 Claims, 3 Drawing Sheets

DELTA LANGUAGE MODEL

TECHNICAL FIELD

This document relates to information processing.

BACKGROUND

Language model training data for a machine translation system can include very substantial amounts of data, such as trillions of words of web data and billions of words of news data. A language model can be associated with translation development and evaluation data. Such translation development and evaluation data can be contained in the training data. This data needs to be removed from the language model training data to avoid training poor feature weights and/or incorrectly estimating quality on truly unseen data.

Some machine translation system covers a large number of language pairs, resulting in a large number of test data sets. For example, some of the test data can include frequent sentences taken from the web. Sometimes, whole documents cannot be filtered but, rather, filtering needs to be performed at a single-sentence level. On the other hand, filtering single sentences might remove too much data, especially for short sentences. For example, removing the sentence "next page" from a language model can be a disadvantage if that sentence is expected to be part of data handled by a live system. Also, it can be a disadvantage if updating or expanding test data for a particular language pair affects other language pairs.

SUMMARY

The invention relates to generating a language model.

In a first aspect, a computer-implemented method for generating a language model includes generating a language model based on a data set, the data set including at least training data and test data. The test data is to be used in testing relating to the language model. The method includes identifying the test data in the data set. The method includes generating a delta language model based on at least the test data, the delta language model configured for evaluating the test data.

Implementations can include one or more of the following features. The delta language model can include direct values for the test data, and the test data can be evaluated using the delta language model without looking up the test data in the language model. Generating the delta language model can further include determining difference values for the test data using the language model and direct values for the test data, wherein the test data can be evaluated using the delta language model and the language model; and storing the difference values as the delta language model. The delta language model can include difference values for the test data, and the test data can be evaluated using the delta language model and the language model. Generating the delta language model can further include determining the difference values using the language model and direct values for the test data; and storing the difference values as the delta language model. Generating the delta language model can further include estimating the difference values using at least the test data; and storing the difference values as the delta language model. Estimating the difference values can include determining, for a specific n-gram in the test data, a value for how many times the specific n-gram occurs in the training data; applying a predetermined reduction to the value to obtain the difference value. Estimating the difference values can include determining how entries in the language model change when generating the delta language model; and storing in the delta language model only those entries change more than a predetermined threshold. The data set can include a plurality of test data sets, and the method can further include generating a corresponding delta language model for each of the test data sets, the corresponding delta language model based on the training data and the one of the data sets for which the corresponding delta language model is generated, but not any other of the plurality of test data sets. The method can further include receiving an additional test sentence for the test data set; and revising the corresponding delta language model for the test data set using the additional test sentence, wherein the language model and remaining ones of the corresponding delta language models are not revised using the additional test sentence. The method can further include implementing the language model and the corresponding delta language models in a machine translation system, each of the test data sets relating to a language handled by the machine translation system. The method can further include determining that all occurrences of a training n-gram came from the test data; generating a truncated history for a word from a history for the word; determining a value for the word based on the truncated history; and modifying the value using a predetermined factor. The method can further include receiving an additional set of test data; and generating another delta language model for the additional set of test data, the other delta language model generated without regenerating the language model and without modifying the delta language model.

In a second aspect, a computer-implemented method for using a language model includes receiving data to be evaluated with a language model generated using a data set including at least training data and test data. The method includes evaluating the data using at least a delta language model if the data occurs in the delta language model, the delta language model based on at least the test data. The method includes evaluating the data using at least the language model if the data does not occur in the delta language model.

Implementations can include one or more of the following features. The delta language model can include direct values for the test data, and evaluating the data can include comparing the data with the delta language model; and upon determining that the data overlaps with the test data, obtaining a corresponding direct value of the direct values as an evaluation of the data. The delta language model can include difference values for the test data, and evaluating the data can include comparing the data with the delta language model; upon determining that the data overlaps with the test data, obtaining a corresponding difference value of the difference values; and adjusting a value from the language model using the corresponding difference value as an evaluation of the data.

In a third aspect, a computer system includes a language model tangibly embodied in a computer readable medium. The language model is based on a data set including at least training data and test data, the test data to be used in testing relating to the language model. The language model is configured for evaluating data that does not overlap with the test data. The system includes a delta language model tangibly embodied in a computer readable medium, the delta language model based on at least the test data, the delta language model configured for evaluating the test data. The system includes an evaluating module configured (i) to evaluate the first data using at least the delta language model if the data occurs in the delta language model; and (ii) to evaluate the data using at least the language model if the data does not occur in the delta language model.

Implementations can include one or more of the following features. The delta language model can include direct values for the test data, and the evaluating module can evaluate the test data using the delta language model without looking up the test data in the language model. The delta language model can include difference values for the test data, and the evaluating module can evaluate the test data using the delta language model and the language model. The difference values can be estimated using at least the test data. The computer system can further include a language model generator that generates at least the language model and the delta language model. The data set can include a plurality of test data sets, and the language model generator can generate a corresponding delta language model for each of the test data sets, each of the corresponding delta language models based on the training data and the one of the test data sets for which the corresponding delta language model is generated, but not any other of the plurality of test data sets.

Implementations can provide any, all or none of the following advantages. A live system can be provided that suffers no quality loss in the live system due to many and/or frequent test sentences. A system can be provided where it is easy to add more test sentences without changing the language model. A system can be provided where adding more test sentences does not affect translation quality. A system can be provided which allows use of a language model having just the current test data removed, not data that is used for other language pairs. A system can be provided that allows adding or changing test data such that only the outcome for a particular test set is affected, outcomes for all other test sets remaining unchanged. A system can be provided that uses all language model training data when translating truly new data.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
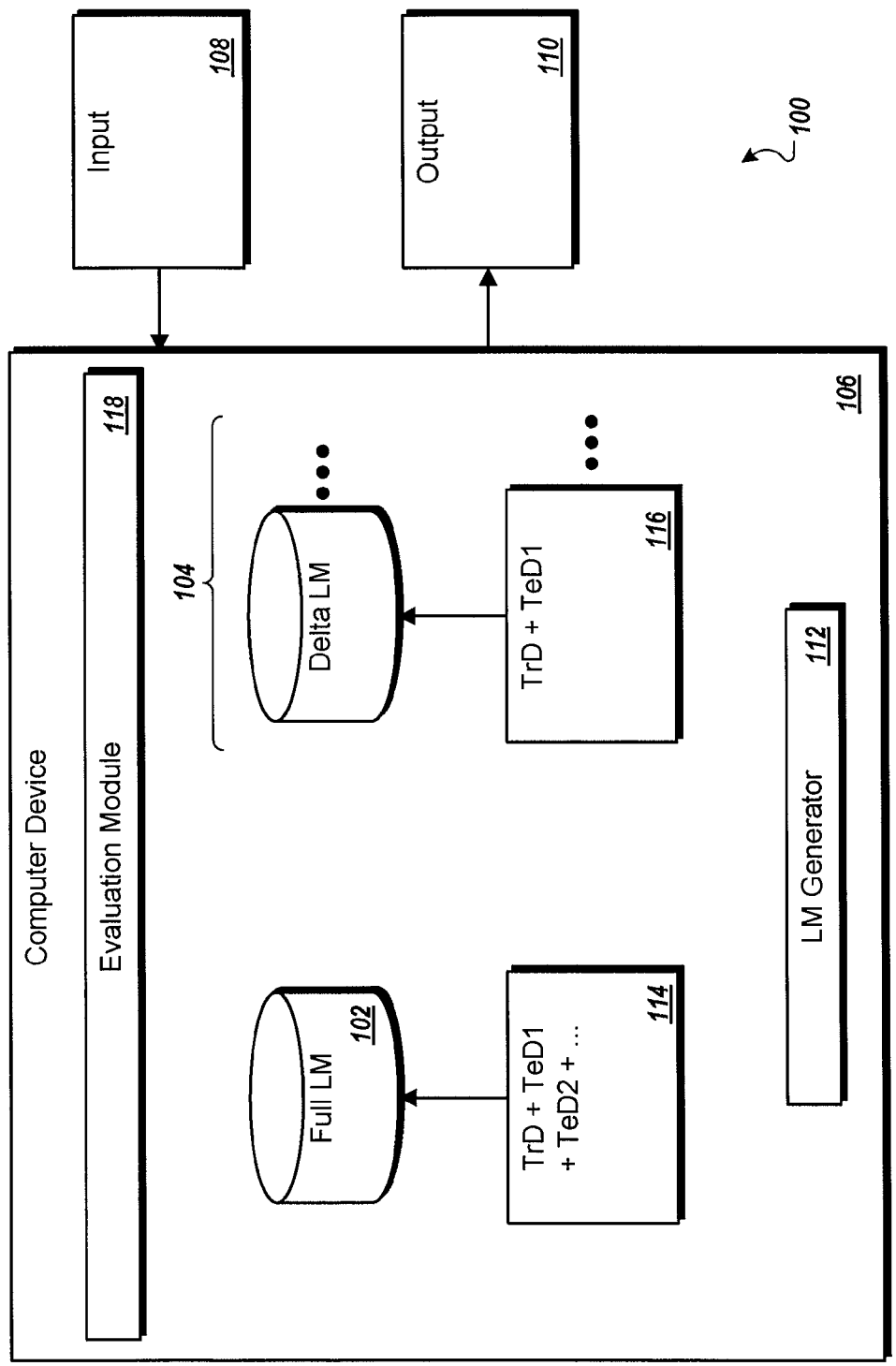
FIG. 1 shows an example of a system with a language model and a delta language model.

FIG. 1 shows an example of a system 100 with a language model and at least one delta language model 104. Here, the system includes a computer device 106 that currently includes the models 102 and 104. For example, the computer device 106 can include any kind of processor-based device, such as a personal computer, a server device or a portable device. In some implementations, the computer device 106 can communicate with one or more other devices through any kind of network, such as the Internet. The computer device 106 can interact with one or more users through an input device 108 such as a keyboard or mouse, and through an output device 110 such as a display device.

In some implementations, the system 100 is included in, or comprises, a machine translation system. The machine translation system 100 can be used in performing automated translations between any of a large number of languages and the models 102 and/or 104 can be used in such an effort. For example, the machine translation system 100 can be used to provide computerized translations to users via a page available on the Internet, where users can type or paste in words, expressions or sentences in one language and receive in return translations in a chosen language performed by the system 100.

In other implementations, the system 100 can be included in or comprise a speech recognition system, optical character recognition system, spelling correction system, and/or any other system that makes use of a language model. For the remainder of this description a machine translation system will be used as an example.

Here, the system 100 includes a language model generator 112 that is configured for generating one or more language models based on data. In this implementation, a first data set 114 is being used to generate the language model 102. The first data set 114 can include a set of training data (TrD) and one or more sets of test data (TeD1, TeD2, ..., TeDN). For example, the language model generator 112 can generate the model 102 by identifying n-grams in the first data set 114, tallying occurrences of the n-grams, and storing the n-grams in association with the corresponding count. The test data may have been explicitly added to the first data set, or may be hidden in the training data. As an example, the latter happens when using an amount of web data as training data and the test data contains sentences or full documents that are part of the web data.

In some implementations, each of the test data sets (TeD1, TeD2, ...) can correspond to the different languages handled by a machine translation system. In terms of explanation, the language model 102 can be considered a full language model because it is based on the entire first data set 114, as opposed to only part thereof. Development and test data then needs to be removed from the training data to obtain quality estimates that are close to truly unseen data which will later be entered by users into a live system. By analogy, the language model 102 can be considered a "dirty" language model because it includes contributions from some or even all test sentences, which contributions for a particular language should preferably be removed before a translation for that language is performed, lest the same-language test sentence make an unwanted contribution to the outcome; hence the goal is to remove or compensate for the "dirt".

By contrast, the delta language model(s) can be generated using less than the full first data set 114. In some implementations, the language model generator 112 uses a second data set 116 that includes the training data (TrD) and one of sets of test data (e.g., TeD1). Accordingly, the delta language model(s) 104 can be generated so that it represents values that are different between the full language model 102 and the model where the test sentences at issue (e.g., the sentences in TeD1) have been removed. Stated in a different way, the delta model stores those n-grams for which the probability value with or without the test sentence(s) are different. In some implementations, each n-gram in the delta language model 104 comes only from TeD1, and every word and every n-gram in TeD1 is reflected in the delta language model 104. By the analogy used above, each of the test data sets (TeD1, TeD2, ..., TeDN) can be considered "dirt" with regard to performing testing using that particular test data.

More than one delta language model 104 can be generated. In some implementations, N delta language models 104 can be generated, each relating to one of the sets of test data (TeD1, TeD2, ..., TeDN). For example, this can save considerable amounts of resources because only the n-grams with differing probability values need be stored in each of the delta language models 104. That is, the delta language models 104 can allow that only one large language model (e.g., the full language model 102), and 20 smaller language models (e.g., the delta language models 104) need be trained. In fact, in such implementations, the most expensive step computationally speaking can be to collect the dirt from the data 114. Training time for the full language model 102 can be large but the training time for each of the delta language models can be much smaller.

Values in the delta language model(s) 104 can be stored according to one or more approaches. In some implementations, direct values can be stored. For example, the direct value stored in the delta language model 104 can represent the exact probability that a given word occurs following a specific history. That is, in such implementations, the probability obtained using the delta language model can form the complete evaluation of the word and it may not be necessary to consult the full language model 102. By the above analogy, the value stored in the delta language model 104 can be considered a "clean" value because it is free from influence by test data and it can be used immediately if necessary.

The following is an example of evaluating an n-gram when the direct-value approach is being used. In some implementations, the evaluation is performed by an evaluation module 118. Upon receipt of an n-gram to be evaluated, it can first be determined whether the n-gram belongs to the delta language model 104. This requires one lookup operation, and the evaluation can thereafter be complete. In contrast, if the first lookup operation yields that the n-gram does not belong to the delta language model 104, it becomes necessary to obtain the probability from the full language model 102, which requires a second lookup operation. Thus at least one, sometimes two, lookup operations are performed.

In other implementations, by contrast, difference values can be stored in the delta language model 104. For example, the difference value can represent a delta between a "dirty" value (based on the first data set 114) and the "clean" value (based on the second data set 116). Thus, a reading from the delta language model 104 in such an implementation would yield the information how the corresponding value in the full language model 102 should be adjusted.

The following is an example of evaluating an n-gram when the difference value approach is being used. In some implementations, the evaluation is performed by the evaluation module 118. Upon receipt of an n-gram to be evaluated, it can first be determined whether the n-gram belongs to the delta language model 104. This requires one lookup operation. If the n-gram belongs, the difference value is obtained. The difference value can then be used in adjusting the corresponding value from the full language model 102. If the first lookup operation yields that the n-gram does not belong to the delta language model 104, the probability from the full language model 102 can be used without adjustment. Thus at least two lookup operations are performed.

In some implementations, data can be added to a test set after the language models 102 and/or 104 are generated. For example, assume that a test sentence is added to the test data set TeD1. Then, the corresponding delta language model 104 would be revised to reflect the influence of the added sentence. Note however, that in such an implementation it may not be necessary to update or modify the full language model 102 or any of the other delta language models 104. Thus, this can provide a flexible way to update the language models that requires less resources and processing. A completely new test data set TeDN+1 may be added which requires generating an additional delta language model. It does not require re-generating the full language model nor changing any of the other delta language models, and adding a new test data set does not change the quality of the full or other delta language models.

The following is an illustration in mathematical terms of the examples described above. When generating an exact version for a so-called Stupid Backoff model one can store the following values. The full language model 102 can contain $$p(w|h) = f(hw)/f(h) \quad (1)$$

where f(x) is the number of times the n-gram x occurs in the training data, w is a word, and h is a history preceding a word. Thus, equation (1) gives the probability p that the word w should follow after the history h.

The delta language model 104 contains $$p'(w|h) = \frac{f(hw) - df(hw)}{f(h) - df(h)} = \frac{p(w|h) * f(h) - df(hw)}{f(h) - df(h)} \quad (2)$$

where df(x) is the number of times the n-gram x occurs because the test data was in the training data (note that the test data may occur multiple times within the training data). In some implementations, the delta language model only stores n-grams for which p(w|h) and p'(w|h) are different. For the so-called Stupid Backoff approach, these are n-grams x for which df(x)>0, which is a small number (test_set_size*max_ngram_order in the worst case).

Figure 2:
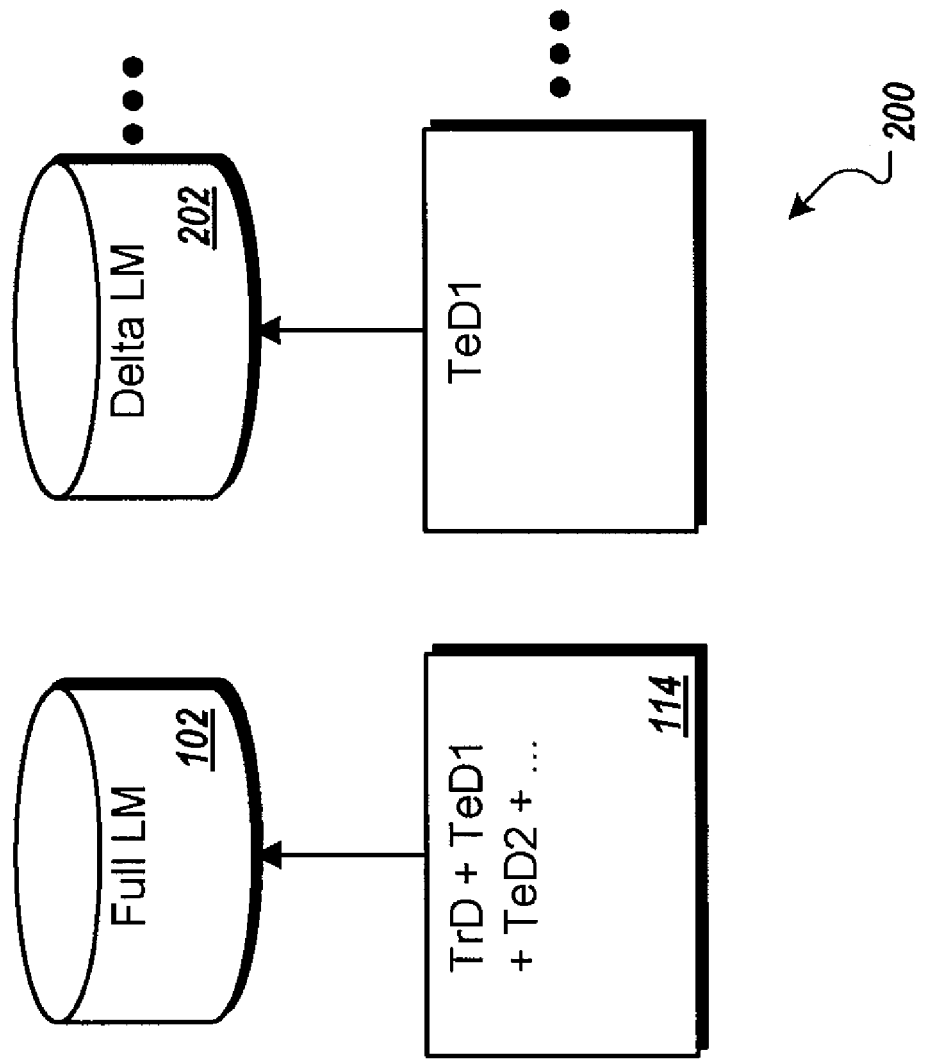
FIG. 2 shows another example of a system with a language model and a delta language model.

FIG. 2 shows another example of a system 200 with a language model and a delta language model. Here, for brevity, only the language models and corresponding data sets are shown, but it should be understood that they could be combined with suitable components for operation, such as those in the system 100. In this example, approximate values will be used in a language model.

Particularly, the full language model 102 is shown as being generated from the first data set 114 similar to the description above. A delta language model 202, by contrast, is generated using test data (e.g., TeD1) but not the actual training data (TrD). Similarly to examples above, more than one delta language model 202 can be generated, such as to provide one delta language model corresponding to each of multiple test data sets TeD1, . . . , TeDN.

The delta language model 202 can be generated using an approximation. In some implementations, the approximation can be based on how many times a word or n-gram occurs in the particular test set. For example, let testf(x) be the number of occurrences of the n-gram x in the test data TeD1. If testf(x) is larger than zero, the term df(x) can then be approximated using $$df(x) \approx 0.9 * f(x) \quad (3)$$

Thus, equation (3) allows an approximation by reducing the number of times the n-gram occurs in the training data.

Other approximations can be used. In some implementations, a threshold can be used. For example, only those entries in the full language model 102 that change more than a predetermined threshold when the delta language model 104 is generated can be stored in the delta language model.

Figure 3:
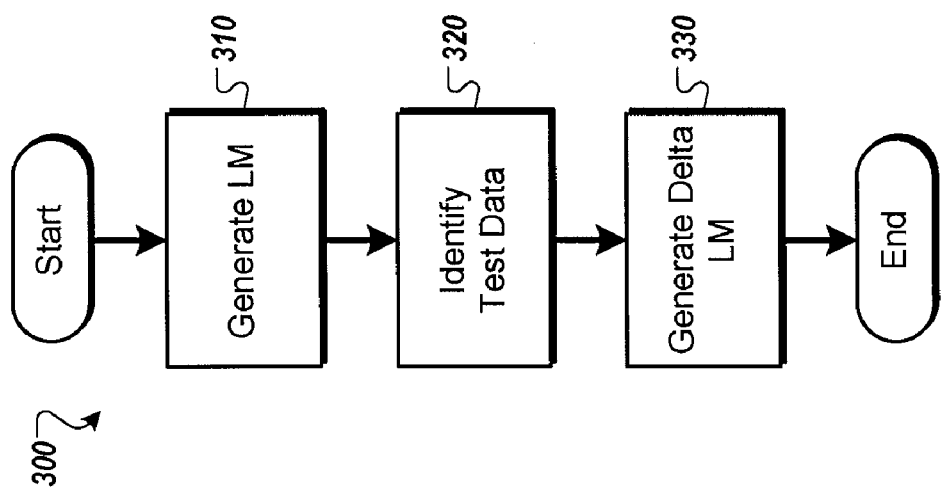
FIG. 3 shows a flowchart of an example of a method for generating a language model.

FIG. 3 shows a flowchart of an example of a method 300 for generating a language model. The method 300 can be performed by a computer executing instructions from a storage medium. For example, the method 300 can be performed by the system 100 and/or 200.

In step 310, a language model is generated based on a data set. The data set includes at least training data and test data. The test data is to be used in testing. Any testing relating to the language model can be involved, such as testing of the language model, testing of a machine translation system or testing of any other system in which the language model is used. For example, the full language model 102 can be generated by the language model generator 112.

In step 320, the test data is identified in the data set. For example, the first data set 114 can be parsed and the words or n-grams relating to the test data TeD1 can be identified.

In step 330, a delta language model is generated based on at least the test data. The delta language model is configured for evaluating the test data. For example, one or more of the delta language models 104 can be generated.

Other steps can be performed. As another example, one or more of the steps can be performed in a different order.

Figure 4:
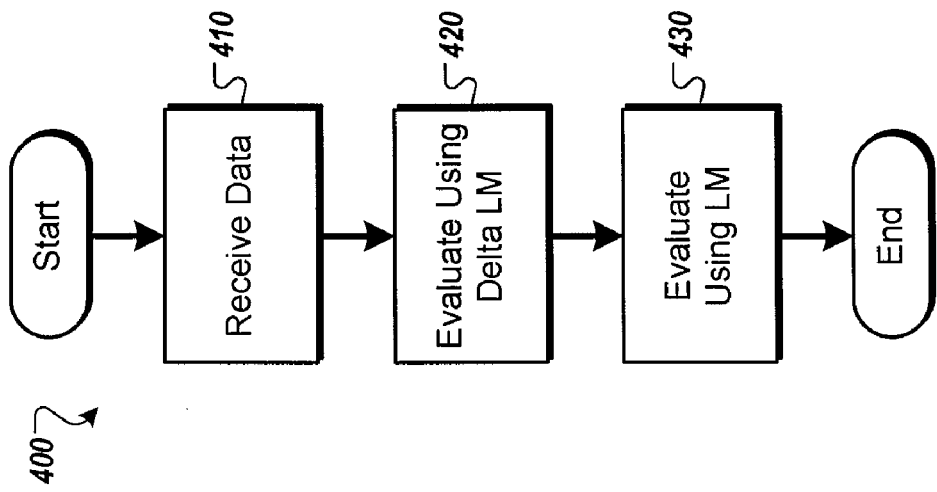
FIG. 4 shows a flowchart of an example of a method for using a language model.

FIG. 4 shows a flowchart of an example of a method 400 for using a language model. The method 400 can be performed by a computer executing instructions from a storage medium. For example, the method 400 can be performed by the system 100 and/or 200.

In step 410, data to be evaluated with a language model is received. The language model is generated using a data set including at least training data and test data. For example, the word w can be received in the system 100 or 200.

In step 420, the first data is evaluated using at least a delta language model if the data occurs in the delta language model. The delta language model is based on at least the first test data. For example, if the word w is part of the test data TeD1, a direct probability value can be looked up in the delta language model 104. As another example, if the word w is part of the test data TeD1, a difference probability value can be looked up in the delta language model 104 and used to adjust a value from the full language model 102.

In step 430, the data is evaluated using at least the language model if the first data does not occur in the delta language model. For example, if the word w is not part of the test data TeD1, a value from the full language model 102 can be obtained and used.

Other steps can be performed. As another example, one or more of the steps can be performed in a different order.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating a language model, the method comprising:

generating, at a data processing apparatus having one or more processors, a language model based on a data set, the data set including at least training data and test data, the test data to be used in testing relating to the language model;

identifying, at the data processing apparatus, the test data in the data set; and generating, at the data processing apparatus, a delta language model based on the data set with the test data removed, the delta language model configured for evaluating the test data.

2. The computer-implemented method of claim 1, wherein the delta language model includes direct values for the test data, wherein the test data can be evaluated using the delta language model without looking up the test data in the language model if the data is found in the delta language model.

3. The computer-implemented method of claim 2, wherein generating the delta language model further comprises:

determining difference values for the test data using the language model and direct values for the test data, wherein the test data can be evaluated using the delta language model and the language model; and storing the difference values as the delta language model.

4. The computer-implemented method of claim 1, wherein the delta language model includes difference values for the test data, wherein the test data can be evaluated using the delta language model and the language model.

5. The computer-implemented method of claim 4, wherein generating the delta language model further comprises:

determining the difference values using the language model and direct values for the test data; and storing the difference values as the delta language model.

6. The computer-implemented method of claim 4, wherein generating the delta language model further comprises:

estimating the difference values using at least the test data; and storing the difference values as the delta language model.

7. The computer-implemented method of claim 6, wherein estimating the difference values comprises:

determining, for a specific n-gram in the test data, a value for how many times the specific n-gram occurs in the training data; and applying a predetermined reduction to the value to obtain the difference value.

8. The computer-implemented method of claim 6, wherein estimating the difference values comprises:

determining how entries in the language model change when generating the delta language model; and storing in the delta language model only those entries change more than a predetermined threshold.

9. The computer-implemented method of claim 1, wherein the data set includes a plurality of test data sets, further comprising:

generating a corresponding delta language model for each of the test data sets, the corresponding delta language model based on the training data and the one of the data sets for which the corresponding delta language model is generated, but not any other of the plurality of test data sets.

10. The computer-implemented method of claim 9, further comprising:

receiving an additional test sentence for the test data set; and revising the corresponding delta language model for the test data set using the additional test sentence, wherein the language model and remaining ones of the corresponding delta language models are not revised using the additional test sentence.

11. The computer-implemented method of claim 9, further comprising:
implementing the language model and the corresponding delta language models in a machine translation system, each of the test data sets relating to a language handled by the machine translation system.

12. The computer-implemented method of claim 1, further comprising:
determining that all occurrences of a training n-gram came from the test data;
generating a truncated history for a word from a history for the word;
determining a value for the word based on the truncated history; and
modifying the value using a predetermined factor.

13. The computer-implemented method of claim 1, further comprising:
receiving an additional set of test data; and
generating another delta language model for the additional set of test data, the other delta language model generated without regenerating the language model and without modifying the delta language model.

14. A computer-implemented method for using a language model, the method comprising:
receiving, at a data processing apparatus having one or more processors, data to be evaluated with a language model generated using a data set including at least training data and test data;
evaluating, at the data processing apparatus, the data using at least a delta language model if the data occurs in the delta language model, the delta language model being generated using the data set with test data removed; and
evaluating, at the data processing apparatus, the data using at least the language model if the data does not occur in the delta language model.

15. The computer-implemented method of claim 14, wherein the delta language model includes direct values for the test data, and wherein evaluating the data comprises:
comparing the data with the delta language model; and
upon determining that the data overlaps with the test data, obtaining a corresponding direct value of the direct values as an evaluation of the data.

16. The computer-implemented method of claim 14, wherein the delta language model includes difference values for the test data, and wherein evaluating the data comprises:
comparing the data with the delta language model;
upon determining that the data overlaps with the test data, obtaining a corresponding difference value of the difference values; and
adjusting a value from the language model using the corresponding difference value as an evaluation of the data.

17. A computer system comprising:
a language model tangibly embodied in a computer readable medium, the language model based on a data set including at least training data and test data, the test data to be used in testing relating to the language model, the language model configured for evaluating data that does not overlap with the test data;
a delta language model tangibly embodied in a computer readable medium, the delta language based on the data set with test data removed the delta language model configured for evaluating the test data; and
an evaluating module configured (i) to evaluate the first data using at least the delta language model if the data occurs in the delta language model; and (ii) to evaluate the data using at least the language model if the data does not occur in the delta language model.

18. The computer system of claim 17, wherein the delta language model includes direct values for the test data, wherein the evaluating module evaluates the test data using the delta language model without looking up the test data in the language model.

19. The computer system of claim 17, wherein the delta language model includes difference values for the test data, wherein the evaluating module evaluates the test data using the delta language model and the language model.

20. The computer system of claim 19, wherein the difference values are estimated using at least the test data.

21. The computer system of claim 17, further comprising a language model generator that generates at least the language model and the delta language model.

22. The computer system of claim 21, wherein the data set includes a plurality of test data sets, and wherein the language model generator generates a corresponding delta language model for each of the test data sets, each of the corresponding delta language models based on the training data and the one of the test data sets for which the corresponding delta language model is generated, but not any other of the plurality of test data sets.

* * * * *